(12) United States Patent
Egi et al.

(10) Patent No.: US 9,910,816 B2
(45) Date of Patent: Mar. 6, 2018

(54) SCALABLE DIRECT INTER-NODE COMMUNICATION OVER PERIPHERAL COMPONENT INTERCONNECT-EXPRESS (PCIE)

(71) Applicant: Futurewei Technologies, Inc., Plano, TX (US)

(72) Inventors: Norbert Egi, Santa Clara, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 238 days.

(21) Appl. No.: 14/089,377

(22) Filed: Nov. 25, 2013

(65) Prior Publication Data

US 2015/0026380 A1    Jan. 22, 2015

Related U.S. Application Data

(60) Provisional application No. 61/857,036, filed on Jul. 22, 2013.

(51) Int. Cl.
*G06F 13/42*    (2006.01)
(52) U.S. Cl.
CPC .............................. *G06F 13/4282* (2013.01)
(58) Field of Classification Search
None
See application file for complete search history.

(56) References Cited

U.S. PATENT DOCUMENTS

| 7,945,722 B2* | 5/2011 | Stewart ............... H04L 49/3009 |
| | | 710/306 |
| 2006/0242330 A1* | 10/2006 | Torudbakken et al. ........... 710/5 |
| 2008/0025289 A1* | 1/2008 | Kapur et al. .................. 370/351 |

(Continued)

FOREIGN PATENT DOCUMENTS

| CN | 101299757 A | 11/2008 |
| CN | 101639811 A | 2/2010 |

(Continued)

OTHER PUBLICATIONS

Title: Asynchronous I/O, Access Date: May 31, 2016; p. 1, link: https://en.wikipedia.org/wiki/Asynchronous_I/O.*

(Continued)

*Primary Examiner* — Henry Tsai
*Assistant Examiner* — Christopher Bartels
(74) *Attorney, Agent, or Firm* — Conley Rose, P.C.

(57) ABSTRACT

A method of communicating data over a Peripheral Component Interconnect Express (PCIe) Non-Transparent Bridge (NTB) comprising transmitting a first posted write message to a remote processor via the NTB, wherein the first posted write message indicates an intent to transfer data to the remote processor, and receiving a second posted write message in response to the first posted write message, wherein the second posted write message indicates a destination address list for the data. Also disclosed is a method of communicating data over a PCIe NTB comprising transmitting a first posted write message to a remote processor via the NTB, wherein the first posted write message comprises a request to read data, and receiving a data transfer message comprising at least some of the data requested by the first posted write message.

17 Claims, 5 Drawing Sheets

(56) References Cited

U.S. PATENT DOCUMENTS

| | | | |
|---|---|---|---|
| 2009/0248941 | A1 | 10/2009 | Morein et al. |
| 2011/0238909 | A1 | 9/2011 | Kumar et al. |
| 2012/0166690 | A1 | 6/2012 | Regula |
| 2012/0254587 | A1* | 10/2012 | Biran .................. G06F 9/3877 712/34 |
| 2013/0010636 | A1* | 1/2013 | Regula ......................... 370/254 |
| 2013/0024595 | A1* | 1/2013 | Subramaniyan ........ G06F 13/28 710/308 |
| 2013/0311685 | A1* | 11/2013 | Kudo et al. ..................... 710/40 |
| 2014/0122765 | A1* | 5/2014 | Subramaniyan .... G06F 13/4022 710/308 |
| 2014/0189187 | A1* | 7/2014 | Acharya ............... G06F 13/385 710/310 |
| 2014/0237157 | A1* | 8/2014 | Takefman ........... G06F 11/1008 711/3 |
| 2015/0169487 | A1* | 6/2015 | Subramaniyan .... G06F 13/4022 710/5 |
| 2015/0378919 | A1* | 12/2015 | Anantaraman ..... G06F 12/0862 711/122 |

FOREIGN PATENT DOCUMENTS

| | | |
|---|---|---|
| CN | 101710314 A | 5/2010 |
| RU | 101225 U1 | 1/2011 |

OTHER PUBLICATIONS

Partial English Translation and Abstract of Chinese Patent Application No. CN101639811A, Dec. 30, 2014, 5 pages.
Partial English Translation and Abstract of Chinese Patent Application No. CN101299757A, Part 1, Jan. 7, 2015, 5 pages.
Partial English Translation and Abstract of Chinese Patent Application No. CN101299757A, Part 2, Jan. 7, 2015, 2 pages.
Foreign Communication From a Counterpart Application, PCT Application No. PCT/CN2014/082724, International Search Report dated Oct. 27, 2014, 7 pages.
Foreign Communication From a Counterpart Application, PCT Application No. PCT/CN2014/082724, Written Opinion dated Oct. 27, 2014, 7 pages.
"Posted Write," Wikipedia, https://en.wikipedia.org/wiki/Posted_write, downloaded from the Internet Dec. 21, 2015, 1 page.
"PCI Express Base Specification Revision 3.0", PCI Express, Nov. 10, 2010, 860 pages.
"Scheduling Algorithms," Encyclopedia of Computer Science, 4th Edition, 2000, p. 1535-1538.
Regula, "Using Non-Transparent Bridging in PCI Express Systems," PLX Technology, Inc., Jun. 1, 2004, 31 pages.
"PCI Express Base Specifications Revisions 1.0a," Retrieved from the Internet: URL: http://pcisig.com/ [retrieved on Sep. 12, 2011], Apr. 15, 2003, 76 pages.
Foreign Communication From a Counterpart Application, European Application No. 14828761.8, Extended European Search Report dated Nov. 14, 2016, 10 pages.
Machines Translation and Abstract of Russian Publication No. RU101225, Part 1, Jan. 10, 2011, 9 pages.
Machines Translation and Abstract of Russian Publication No. RU101225, Part 2, Jan. 10, 2011, 6 pages.
Foreign Communication From a Counterpart Application, Russian Application No. 2016105513/08, Russian Office Action dated May 12, 2017, 8 pages.
Foreign Communication From a Counterpart Application, Russian Application No. 2016105513/08, English Translation of Russian Office Action dated May 12, 2017, 6 pages.
Foreign Communication From a Counterpart Application, Russian Application No. 2016105513/08, Russian Search Report dated Jul. 22, 2014, 2 pages.
Budruk, R., et al. "PCI Express System Architecture" Mindshare, Inc., 2004, 145 pages.
Regula, J. "Using Non-transparent Bridging in PCI Express Systems" Jun. 1, 2004, 31 pages.
Kong, K. "Non-transparent Bridging with IDT 89HPES32NT24G2 PCI Express NTB Switch" Application Note AN 724, Sep. 30, 2009, 27 pages.
Kazmi, A. "Non-Transparent Bridging Makes PCI-Express HA Friendly" EE Times Connecting the Global Electronics Community, Aug. 14, 2003, 6 pages.
Foreign Communication From A Counterpart Application, European Application No. 14828761.8, European Search Report dated Jun. 3, 2016, 6 pages.

* cited by examiner

SCALABLE DIRECT INTER-NODE COMMUNICATION OVER PERIPHERAL COMPONENT INTERCONNECT-EXPRESS (PCIE)

CROSS-REFERENCE TO RELATED APPLICATIONS

The present application claims priority to U.S. Provisional Patent Application 61/857,036, filed Jul. 22, 2013 by Guangyu Shi, et. al., and entitled "Scalable Direct Inter-Node Communication Over Peripheral Component Interconnect-Express," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data centers may comprise large clusters of servers. Data center servers may accept requests from users and respond to such requests. For example, servers may host data and transmit such data to a user upon request. A server may also be configured to host processes. As such, a user may transmit a request to a server to perform a process, the server may perform the process, and then the server may respond to the user with the results of the process. A server may comprise a plurality of components to process user requests and communicate with the user. Such servers may be interconnected using various networking devices and techniques. For example, a server may be positioned in a chassis and may be interconnected with other servers in other chassis using Open Systems Interconnection (OSI) model layer two (e.g. Media Access Control (MAC)) and/or layer three (e.g. Internet Protocol (IP)) techniques.

SUMMARY

In one embodiment, the disclosure includes a method of communicating data over a Peripheral Component Interconnect Express (PCIe) Non-Transparent Bridge (NTB) comprising transmitting a first posted write message to a remote processor via the NTB, wherein the first posted write message indicates an intent to transfer data to the remote processor, and receiving a second posted write message in response to the first posted write message, wherein the second posted write message indicates a destination address list for the data.

In another embodiment, the disclosure includes a method of communicating data over a PCIe NTB comprising transmitting a first posted write message to a remote processor via the NTB, wherein the first posted write message comprises a request to read data, and receiving a data transfer message comprising at least some of the data requested by the first posted write message.

In another embodiment, the disclosure includes a processor comprising a receive queue, a transmit queue, and a completion queue, and configured to couple to a PCIe NTB, and read data from and write data to a plurality of remote processors via the receive queue, the transmit queue, the completion queue and the PCIe NTB without using non-posted messages.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In contrast with a data center architecture comprising a plurality of self-contained servers, a disaggregated data center architecture may be employed to support pools of resource modules. Such resource modules may not be positioned in a common chassis and may be interconnected in a manner to allow dynamic resource sharing. Such modules may also be designed for backwards compatibility such that data center upgrades may be undertaken on a module by module basis with fine granularity instead of a more expensive server by server basis. For example, a data center comprising insufficient processor resources may be outfitted with a single additional processor module instead of upgraded with a complete server comprising processors, memory, dedicated process acceleration circuits, a Network Interface Card (NIC), etc. In a disaggregated architecture, the resource modules may be connected via a unified interconnection. Such a unified interconnection may be deployed using Peripheral Component Interconnect Express (PCIe). Processor modules connected via PCIe may each employ a locally significant memory address space. Such processor modules may connect via a PCIe Non-Transparent Bridge (NTB), which may translate locally significant addresses to addresses understood by the entire network and/or to an address space employed by a remote processor module. Each processor may be associated with a requestor identifier (ID).

PCIe systems may employ posted messages and non-posted message. A posted message may be a message that may be treated by associated hardware as not requiring a response. Memory write messages may be posted messages. A non-posted message may be a message that may be treated by associated hardware as requiring a response. Memory read messages, input output (I/O) read and/or write messages, and/or configuration read and/or write messages may be non-posted messages. A NTB may route messages by statefully storing a requestor ID associated with each non-posted message in a requestor ID Look-Up Table (R-LUT). Upon receiving a response to a non-posted request message, the NTB may employ the R-LUT to determine which request message the response is associated with and to determine where to send the response. NTB R-LUT tables may not be designed to support large scale interconnectivity. For example, a NTB R-LUT may comprise insufficient memory space to support more than thirty-two simultaneously connected processors. As such, the PCIe NTB R-LUT may create difficulties in deployment of large scale processor resource pools in a disaggregated data center architecture.

Disclosed herein is a mechanism to bypass the PCIe NTB R-LUT in a backwards compatible manner to allow the creation of large scale processor resource pools. Each processor may be configured to communicate exclusively with posted messages (e.g. memory writes) as such messages may not use up available entries in the PCIe NTB R-LUT. Management of such posted messages may be carried out at the software level (e.g. instead of the hardware level) so that such posted messages may or may not elicit responses as needed. Each processor may be configured to comprise a receive (RX) queue, a transmit (TX) queue, and a completion queue. Each posted message may be analyzed based on the message's content and placed in an associated queue. The processor may then act on each message based on the queue to which the message has been assigned. For example, messages indicating the processor should prepare to receive a data transfer may be placed in the RX queue. Messages indicating the processor should prepare to perform a data transfer may be positioned in the TX queue. Messages indicating a data transfer is complete may be positioned in the completion queue. By employing the RX, TX, and completion queues, a processor may setup and perform data transfers (e.g. data reads and writes) with other processors over a NTB using only posted messages (e.g. write messages), and may thereby avoid scalability limitations associated with the NTB R-LUT. While the mechanisms discussed herein may be employed to support a disaggregated data center architecture, it should be noted that such mechanisms may be employed to support PCIe based connectivity in any other data center architecture, such as server based data centers.

Figure 1:
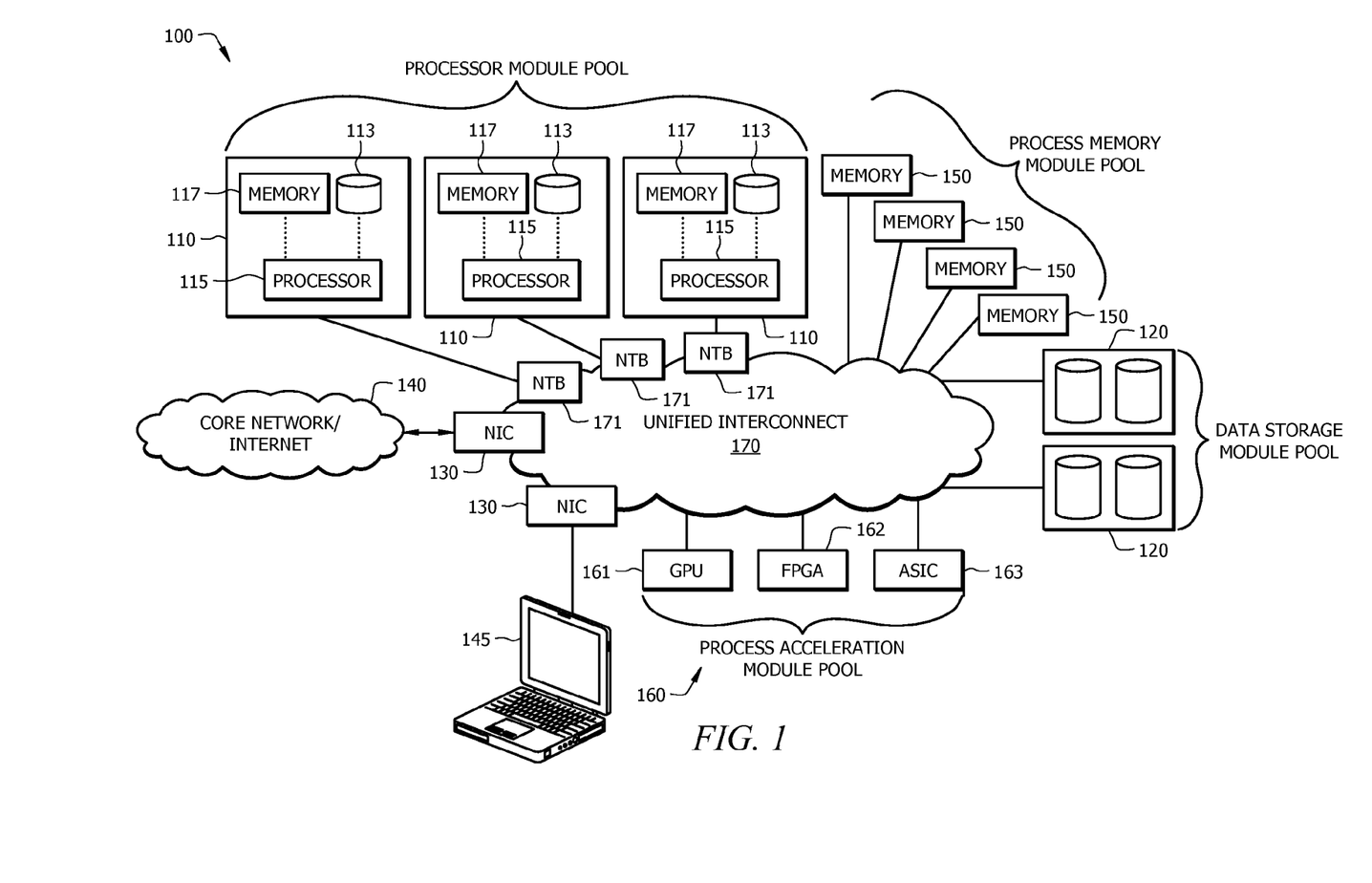
FIG. 1 is a schematic diagram of an embodiment of a disaggregated data center network architecture.

FIG. 1 is a schematic diagram of an embodiment of a disaggregated data center network architecture 100. Network 100 may comprise a pool of processor modules 110, a pool of process memory modules 150, a pool of data storage modules 120, a pool of process acceleration modules 160, and a pool of NIC modules 130, which may be connected via a unified interconnect network 170. The processor modules 110, process memory modules 150, data storage modules 120, process acceleration modules 160, NIC modules 130, and unified interconnect network 170 may be positioned in a common datacenter and may not be positioned in a common enclosure (e.g. each module may comprise a separate server, server blade, network element, chassis, etc.) Each module pool may comprise a plurality of resource modules each configured to perform a common function. The processor modules 110 may each share access to the other modules' resources via the unified interconnect network 170. The unified interconnect network 170 may employ a protocol common to all modules, such as PCIe, which may allow individual modules to be upgraded, added, and/or removed without creating module incompatibility. The processor modules' 110 ability to share resources may also allow for resource load balancing and may reduce process bottlenecks.

Each module (e.g. processor modules 110, process memory modules 150, data storage modules 120, process acceleration modules 160, and/or NIC modules 130) may comprise and/or consist essentially of the components necessary to perform a portion of a task and may be positioned in a separate NE from all other modules. For example, processor modules 110 may comprise and/or consist essentially of a processor 115, which may be a single processor and/or a processor cluster. Processor module 110 may also optionally comprise and/or consist essentially of local process memory 117 and local storage 113 as well as transmission components to connect to the unified interconnect network 170 and power related components. Processor modules 110 may be positioned in a blade server, which may be less expensive and physically smaller than rack servers, and may be unable to provide complete functionality without access to the unified interconnect network 170. Processor modules 110 may operate to manage typical data center tasks such as managing data storage, hosting processes, responding to client queries, etc.

Network 100 may comprise a pool of process memory modules 150, which may comprise and/or consist essentially of memory (e.g. Random Access Memory (RAM), processor cache, etc.) that may store processor data for related to active processes. Process memory modules 150 may comprise storage resources that may be allocated to a particular processor 115, a particular processor module 110, and/or shared by a plurality or processor modules 110. The allocation of memory modules 150 may be dynamically changed based on the needs of the network 100 at a specified time. A process memory module 150 may be positioned on a blade server. For example, a process memory module 150 may consist essentially of memory, transmission components to support connection with unified interconnect network 170, and power components.

Network 100 may comprise a pool of data storage modules 120, which may comprise and/or consist essentially of data storage devices configured for long term storage (e.g. disk drives, solid state drives, redundant array of independent disks (RAID), etc.) Data storage modules 120 may comprise storage resources that may be allocated to a particular processor 115, a particular processor module 110, and/or shared by a plurality of processor modules 110. The allocation of data storage modules 120 may be dynamically changed based on the needs of the network 100 at a specified time. A data storage module 120 may be positioned on a blade server. For example, a data storage module 120 may consist essentially of data storage device(s), transmission components to support connection with unified interconnect network 170, and power components.

Network 100 may comprise a pool of process acceleration modules 160, which may comprise and/or consist essentially of process accelerators such as application specific integrated circuits (ASICs) 163, field programmable gate arrays (FPGAs) 162, graphics processing units (GPUs) 161, digital signal processors (DSPs), etc. Process accelerators may be optimized for a specific task and may perform such specific tasks more quickly and/or efficiently than a general processing unit (e.g. processors 115). A processor 115 may wish to offload all or part of a particular process and may transmit a resource request to process acceleration modules 160, and process acceleration modules 160 may employ process accelerators to complete the process and transmit resulting data back to the requesting processor 115. Process acceleration modules 160 may comprise processing resources that may be allocated to a particular processor 115, a particular processor module 110, and/or shared by a plurality or processor modules 110. The allocation of a process acceleration module 160 may be dynamically changed based on the needs of the network 100 at a specified time. A process acceleration module 160 may be positioned on a blade server. For example, a process acceleration module 160 may consist essentially of a process accelerator (e.g. ASIC 163, FPGA 162 and/or GPU 161), transmission components to support connection with unified interconnect network 170, and power components.

Network 100 may comprise a pool of NIC modules 130, which may comprise and/or consist essentially of NICs configured to communicate with a data center core network 140, the Internet, and/or a local client device 145 on behalf of the other modules. As an example, NIC modules 130 may comprise connectivity resources that may be allocated to a particular processor 115, a particular processor module 110, and/or shared by a plurality of processor modules 110. The allocation of a NIC module 130 and/or NIC module 130 resources may be dynamically changed based on the needs of the network 100 at a specified time. As another example, the NIC modules 130 may be configured to communicate with the core network on behalf of the processor modules 110, the process acceleration modules 160, the process memory modules 150, the storage modules 120, or combinations thereof. As such, a processor module 110 may direct other modules to communicate output directly to the NIC 130 without returning to a processor module 110. A NIC module 130 may be positioned on a blade server. For example, a NIC module 130 may consist essentially of NIC(s) for communication with the core network 140, transmission components to support connection with unified interconnect network 170, and power components. NIC modules may also implement remote direct memory access (RDMA).

The pools of modules (e.g. processor modules 110, process memory modules 150, data storage modules 120, process acceleration modules 160, and/or NIC modules 130) may be interconnected by a unified interconnect network 170. The unified interconnect network 170 may transport communications between the modules and/or pools in a non-blocking manner. The unified interconnect network 170 may comprise any hardware and/or protocols that may be compatible with all modules. For example, the unified interconnect network 170 may comprise a PCI-e network. The unified interconnect network 170 may not be confined to a particular module (e.g. positioned inside a server blade) and/or chassis and may be routed throughout a data center. Modules comprising components that do not natively support connections via the unified interconnect network 170 may comprise processors and/or other connection components to support interconnectivity.

The unified interconnect network 170 may, for example, comprise a plurality of PCIe compatible NTBs 171. A NTB 171 may act as gateway for communications passing between a particular processor 115 and/or process module 110 and the unified interconnect 170. While each processor 115 and/or process module 110 may be connected to a logically dedicated NTB 171, multiple NTBs 171 may or may not be positioned in a single physical device (not shown). Each processor 115 and/or processor module 110 may comprise a locally significant memory address space that may not be recognized by other processors 115, processor modules 110, and/or other network 100 devices. Each NTB 171 may be configured to perform network address translation on behalf of the processor 115 and/or processor module 110 to allow communication with other processors and/or modules. For example, a first NTB 171 connected to a first processor 115 may translate messages addressed in the first processor's 115 address space into an address space understood across the unified interconnect 170 and vice versa. Likewise, a second NTB 171 may perform the same translations for a connected second processor 115, which may allow communication between the first processor 115 and the second processor 115 via address translation at the first NTB 171 and the second NTB 171.

Processors 115 and/or processor modules 110 may communicate across the NTBs 171 via posted messages and non-posted messages. A posted message may not require a response, while a non-posted message may require a response. A NTB 171 may comprise a R-LUT. When receiving a non-posted message, for example from a remote processor, a NTB 171 may store a requester ID associated with the remote processor in the R-LUT. Upon receiving a response to the non-posted message, for example from a local processor, the NTB 171 may consult the R-LUT to determine where to send the response. NTB 171 R-LUTs may be stateful and may be designed to support a relatively small number of processors (e.g. maximum of eight or thirty-two). As such, a NTB 171 R-LUT may prevent scalability of network 100 beyond thirty-two processor modules 110. However, processors 115 may be configured to avoid the R-LUT by employing only posted messages, which may allow for scalability up to about sixty-four thousand processors. To manage transactions using only posted messages, processors 115 and/or processor modules 110 may be required to manage communications at the software level instead of at the hardware level. For example, a processor 115 may be configured with a RX queue, a TX queue, and a completion queue. The RX queue(s), TX queue(s), and completion queue(s) may be configured as First In First Out (FIFO) queues. The processors 115 may be configured to recognize that a posted write message may not invoke a write and may instead carry other information. The processors 115 may analyze the contents of an incoming message (e.g. data packet) and place the message in a queue according to the messages content, for example based on the address and/or based on a command encoded in the message payload. Messages relating to an impending transmission of data may be placed in the TX queue, messages related to an impending receipt of data may be placed in the RX queue, and messages related to the completion of a transaction may be placed in a completion queue. The processor 115 and/or processor modules 110 may then treat each message based on the queue to which the message has been assigned.

Figure 2:
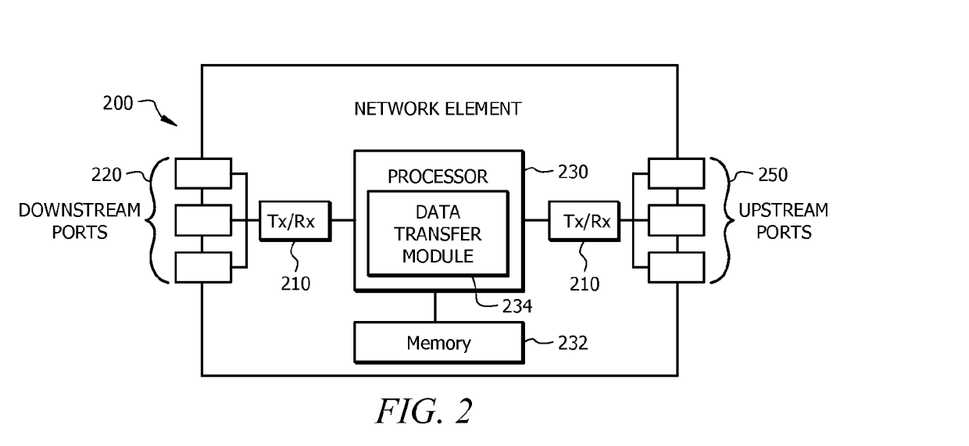
FIG. 2 is a schematic diagram of an embodiment of a network element (NE), which may act as a node within a disaggregated data center network architecture.

FIG. 2 is a schematic diagram of an embodiment of a NE 200, which may act as a node (e.g. a processor module 110) within a disaggregated data center network architecture, such as disaggregated data center network architecture 100. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented using a network apparatus or component such as a NE 200. For instance, the features/methods in the disclosure may be implemented using hardware, firmware, and/or software installed to run on hardware. The NE 200 may be any device that transports frames through a network, e.g., a switch, router, bridge, server, a client, etc. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes, a Tx/Rx 210 coupled to plurality of upstream ports 250 for transmitting and/or receiving frames from other nodes. A processor 230 may be coupled to the Tx/Rxs 210 to process the frames and/or determine which nodes to send frames to. The processor 230 may comprise one or more multi-core processors and/or memory devices 232, which may function as data stores, buffers, etc. Processor 230 may be implemented as a general processor or may be part of one or more ASICs and/or DSPs. Processor 230 may comprise a data transfer module 234, which may implement a RX queue, a TX queue, a completion queue, and/or may implement read and/or write operations using only post messages to bypass a PCIe NTB R-LUT. In an alternative embodiment, the data transfer module 234 may be implemented as instructions stored in memory 232, which may be executed by processor 230. In another alternative embodiment, the data transfer module 234 may be implemented on separate NEs. The downstream ports 220 and/or upstream ports 250 may contain electrical and/or optical transmitting and/or receiving components. NE 200 may or may not be a routing component that makes routing decisions.

It is understood that by programming and/or loading executable instructions onto the NE 200, at least one of the processor 230, data transfer module 234, downstream ports 220, Tx/Rxs 210, memory 232, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
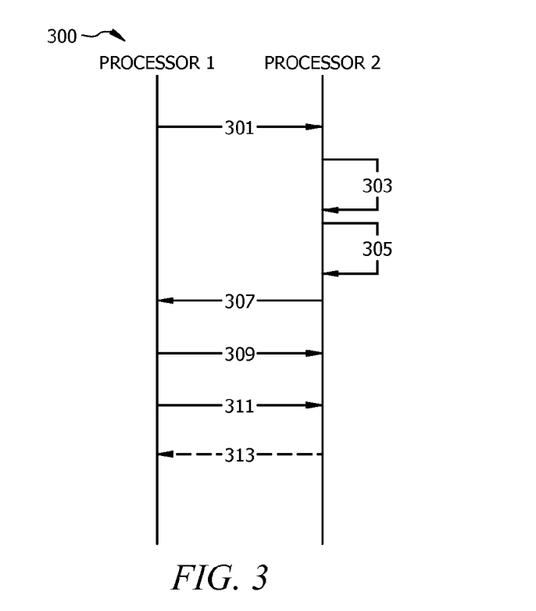
FIG. 3 is a protocol diagram of an embodiment of a method of writing data using only write post messages.

FIG. 3 is a protocol diagram of an embodiment of a method 300 of writing data using only write post messages. For example, method 300 may be implemented in a processor (e.g. processor 115) and/or in a processor module (e.g. processor module 110). Such a processor, referred to herein as a first processor, a local processor, and/or Processor 1, may wish to write data to another processor, referred to herein as a second processor, remote processor, and/or Processor 2, via a PCIe NTB, such as NTB 171. While Processor 1 may operate in network 100, it should be noted that Processor 1 may also be positioned in any other PCIe based network. Processor 2 may or may not be substantially similar to Processor 1 and may or may not be positioned in the same chassis as Processor 1. Processor 1 and Processor 2 may both be configured with a RX queue, a TX queue, and a completion queue.

Processor 1 may be aware of the size of the data to be sent to Processor 2. At step 301, Processor 1 may transmit a write post message (e.g. a data packet) to Processor 2. The write post message of step 301 may comprise information related to the data to be sent and may include the size of the data. As Processor 1 may wish for Processor 2 to receive the data, the write post message of step 301 may be transmitted to Processor 2's RX queue, for example based on an address associated with the queue or based on a command encoded in the payload of the message. Once the message of step 301 reaches the front of the RX queue, Processor 2 may perform step 303 by allocating memory to receive the data based on the data size. Processor 2 may also pin associated virtual pages to prevent such pages and associated data from being swapped out (e.g. removed from memory to a hard disk) before completion of the write indicated at step 301. At step 305, Processor 2 may create a destination address list, such as a Scatter Gather List (SGL), comprising addresses of memory locations allocated to receive the transmitted data. At step 307, Processor 2 may transmit a write post message to Processor 1. The write post message of step 307 may comprise the destination memory address list (e.g. as generated at step 305). As the write post message of step 307 may relate to a data transmission from Processor 1, the write post message may be transmitted to Processor 1's TX queue. Once the message of step 307 reaches the front of the TX queue, Processor 1 may perform step 309 by moving the data to the memory addresses listed in the destination address list. Step 307 may be performed by transmitting write post message(s) comprising the data, by employing Direct Memory Access (DMA), etc. At step 311, Processor 1 may transmit a write post message to Processor 2 indicating that the associated data transfer has been completed. As the write post message of step 311 relates to a message completion, the write post message of step 311 may be transmitted to Processor 2's completion queue. Upon receiving all data, Processor 2 may also transmit a write post completion message to Processor 1 at step 313. The message of step 313 may indicate that all data has been received by Processor 2. As the write post message of step 313 relates to a message completion, the write post message of step 313 may be transmitted to Processor 1's completion queue. Step 313 may be optional. Step 313 is illustrated as a dashed arrow in FIG. 3 to indicate the optional nature of step 313.

Figure 4:
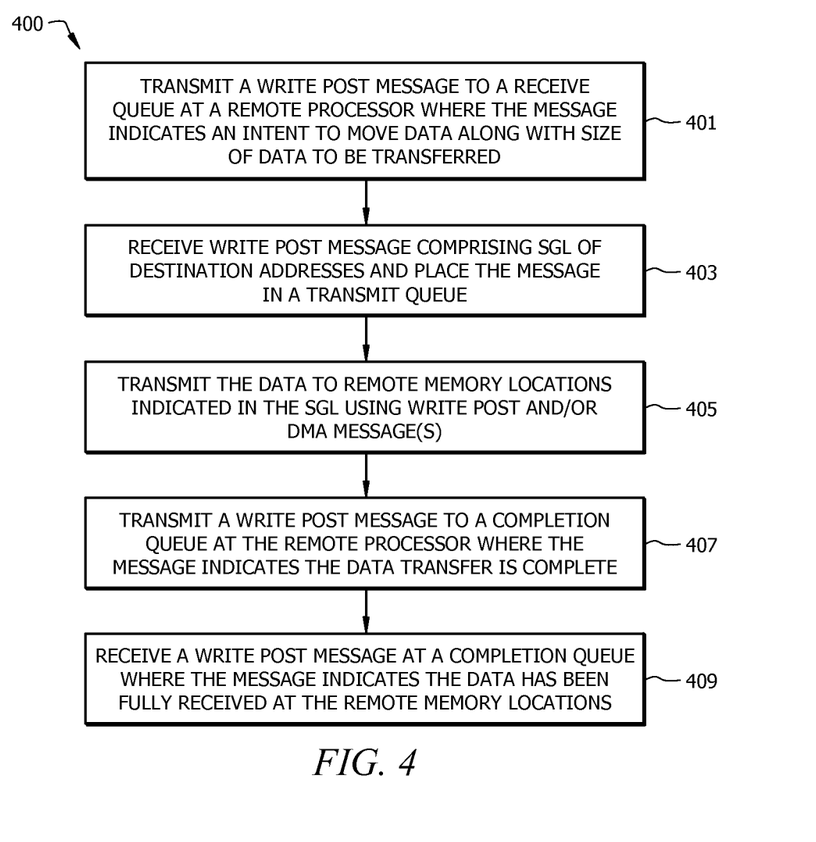
FIG. 4 is a flow chart of an embodiment of another method of writing data using only write post messages FIG. 5 a protocol diagram of an embodiment of a method of reading data using only write post messages when the data size is known.

FIG. 4 is a flow chart of an embodiment of another method 400 of writing data using only write post messages. Method 400 may be implemented by a local processor (e.g. a Processor 1) wishing to write data to a remote processor (e.g. Processor 2), both of which may be substantially similar to the processors discussed in reference to method 300. At step 401, a write post message may be transmitted to a receive queue at a remote processor (e.g. Processor 2). The message of step 401 may indicate an intent to move data along with size of data to be transferred. At step 403, a write post message may be received from the remote processor. The write post message of step 403 may comprise an SGL of destination addresses and may be placed in a transmit queue. At step 405, write post message(s) and/or DMA may be employed to transmit the data to the remote memory locations indicated in the SGL. At step 407, a write post message may be transmitted to a completion queue at the remote processor. The message of step 407 may indicate the data transfer is complete. At step 409, a write post message may be received at a completion queue. The write post message of step 409 may indicate the data has been fully received at the remote memory locations specified by the SGL received at step 403.

Figure 5:
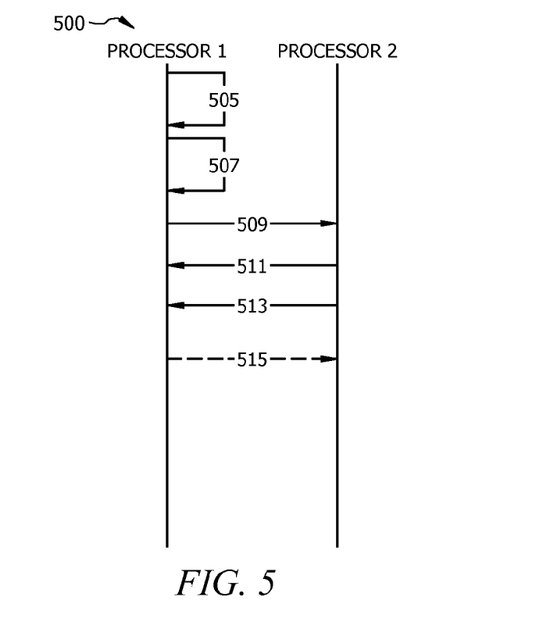

FIG. 5 a protocol diagram of an embodiment of a method 500 of reading data using only write post messages when the data size is known. Method 500 may be implemented by a local processor (e.g. a Processor 1) wishing to read data from a remote processor (e.g. Processor 2), both of which may be substantially similar to the processors discussed in reference to methods 300 and/or 400. At step 505, Processor 1 may already be aware of the size of the data to be requested. Processor 1 may be aware of the data size as the result of other protocols, because of a previously received message, because a related process initiating the request has indicated the data size, etc. Processor 1 may allocate associated memory and/or pin pages in a manner similar to step 303 based on the Processor's prior knowledge of the size of data to be requested. At step 507, Processor 1 may create a destination address list for the data in a manner similar to step 305. At step 509, Processor 1 may transmit a write post message to Processor 2. The write post message of step 509 may comprise a request to read data, an indication of the data to be read, and the destination address list created at step 507. As the write post message of step 509 may relate to a transmission from Processor 2, the write post message of step 509 may be transmitted to Processor 2's TX queue. At step 511, Processor 2 may transmit the requested data to the destination address(es) in the destination address via DMA, additional write post messages, etc. in a manner similar to step 309. At step 513, Processor 2 may transmit a write post message indicating the completion of the transfer in a manner similar to step 311. The write post message of step 513 may be transmitted to Processor 1's completion queue. Optionally, Processor 1 may transmit a completion write post message to Processor 2's completion queue at step 515 in a manner similar to step 313.

Figure 6:
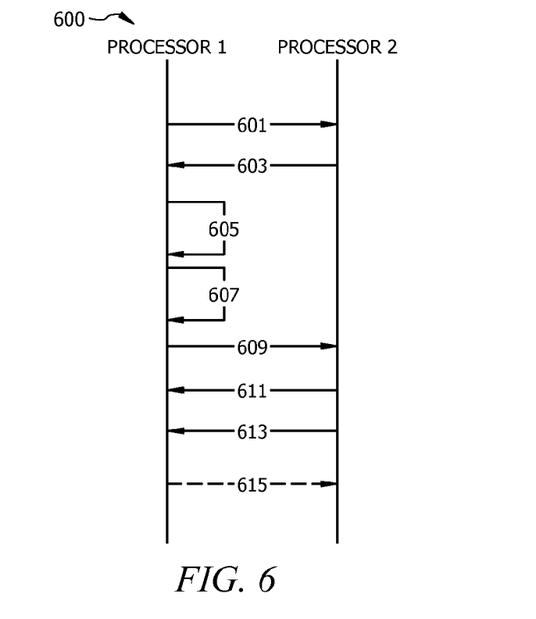
FIG. 6 a protocol diagram of an embodiment of a method of reading data using only write post messages when the data size is unknown.

FIG. 6 a protocol diagram of an embodiment of a method of reading data using only write post messages when the data size is unknown. Method 600 may be implemented by a local processor (e.g. a Processor 1) wishing to read data from a remote processor (e.g. Processor 2), both of which may be substantially similar to the processors discussed in reference to methods 300, 400, and/or 500. Method 600 may be substantially similar to method 500, but may be implemented when Processor 1 is unaware of the size of the data to be requested. At step 601, Processor 1 may transmit a write post message indicating an intent to read data from Processor 2 and identifying the data to be read. As the write post message of step 601 may be related to a transmission by Processor 2, the write post message of step 601 may be routed to Processor 2's TX queue. Once the message of step 601 reaches the front of the TX queue, Processor 2 may proceed to step 603 and transmit a write post message to Processor 1 indicating the size of the data to be read. As the write post message of step 603 may be related to data to be received by Processor 1, the message of step 603 may be forwarded to Processor 1's RX queue. Once the message of step 603 reaches the front of the RX queue, Processor 1 may proceed with step 605. Steps 605, 607, 609, 611, 613, and 615 may be substantially similar to steps 505, 507, 509, 511, 513, and 515.

Figure 7:
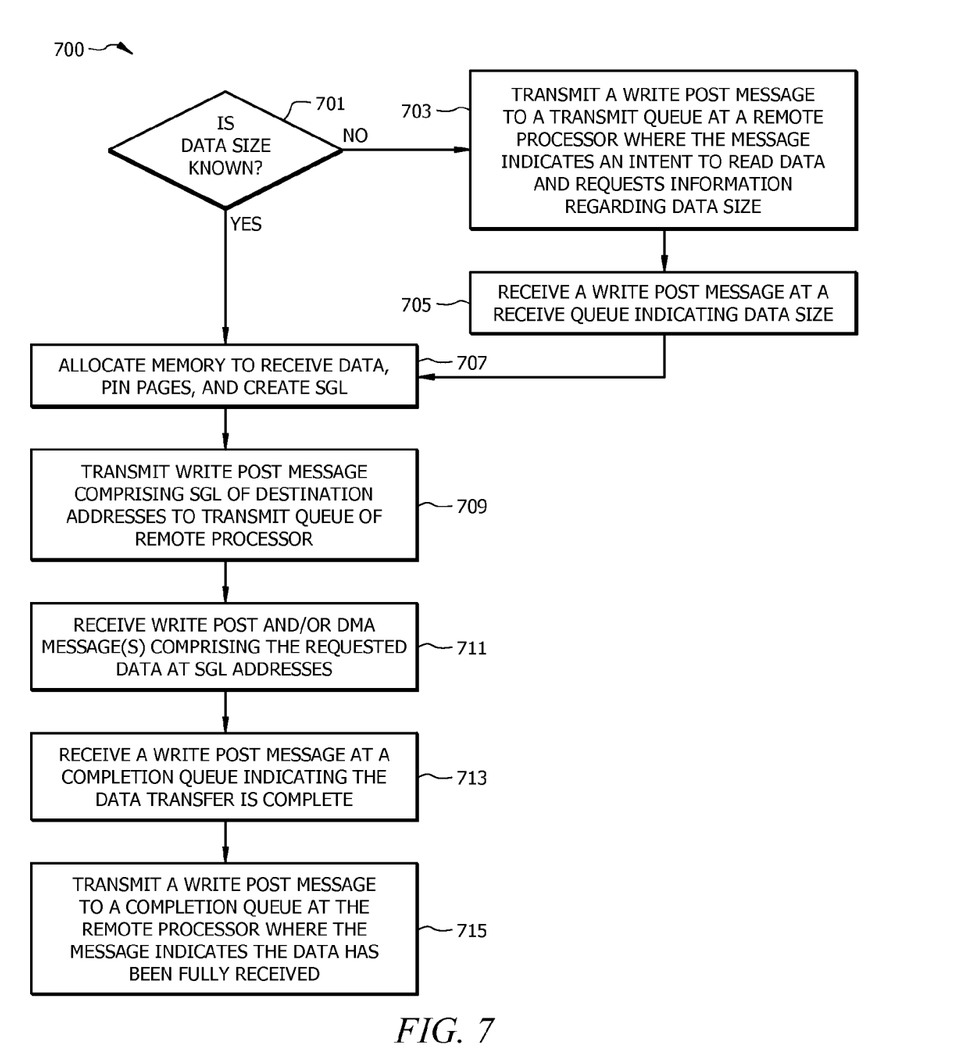
FIG. 7 is a flow chart of another embodiment of a method of reading data using only write post messages.

FIG. 7 is a flow chart of another embodiment of a method 700 of reading data using only write post messages. Method 700 may be implemented by a local processor (e.g. a Processor 1) wishing to read data from a remote processor (e.g. Processor 2), both of which may be substantially similar to the processors discussed in reference to methods 300, 400, 500, and/or 600. At step 701, method 700 may determine whether the size of the data to be read is known. The method 700 may proceed to step 707 if the data size is known and step 703 if the data size is unknown. At step 703, a write post message may be transmitted to a transmit queue at a remote processor. The message of step 703 may indicate an intent to read data and request information regarding a size of the associated data. At step 705, a write post message may be received at a receive queue. The message of step 705 may indicate the size of the requested data. The method 700 may then proceed to step 707. At step 707, memory may be allocated to receive the data based on the data size, associated pages may be pinned, and an SGL of allocated memory addresses may be created. At step 709, a write post message comprising the SGL of destination addresses may be transmitted to the transmit queue of remote processor. At step 711, write post message(s) and/or DMA messages comprising the requested data may be received at the destination addresses listed in the SGL. At step 713, a write post message may be received at a completion queue and may indicate the data transfer is complete. Optionally, at step 715, a write post message may be transmitted to a completion queue at the remote processor. The write post message of step 715 may indicate the data has been fully received at the destination addresses.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for a local processor to move data to a remote memory associated with a remote processor over a Peripheral Component Interconnect Express (PCIe) Non-Transparent Bridge (NTB), the method comprising:
    transmitting a first message to a first queue, wherein the first message indicates an intent to move data to the remote memory and wherein the first queue is associated with the remote processor;
    receiving a second message at a second queue, wherein the second message is in response to the first message, wherein the second message comprises a destination address list of the remote memory, and wherein the second queue is associated with the local processor; and
    moving the data to the remote memory according to the destination address list,
    wherein the local processor and remote processor are coupled via the PCIe NTB, and
    wherein the transmitting and receiving steps are performed using posted memory write transactions sent through the PCIe NTB.

2. The method of claim 1, wherein the step of moving the data is performed using a posted memory write transaction sent through the PCIe NTB.

3. The method of claim 1, wherein the step of moving the data is performed using Direct Memory Access (DMA) over the PCIe NTB.

4. The method of claim 1, further comprising transmitting a third message to a third queue, wherein the third message indicates completion of a transfer of the data, wherein the third queue is associated with the remote processor, and wherein the step of transmitting the third message is performed using a posted memory write transaction sent through the PCIe NTB.

5. The method of claim 1, further comprising receiving a third message at a third queue, wherein the third message indicates full reception of the data, wherein the third queue is associated with the local processor, and wherein receiving the third message is performed using a posted memory write transaction sent through the PCIe NTB.

6. A method for a local processor to receive data from a remote processor over a Peripheral Component Interconnect Express (PCIe) Non-Transparent Bridge (NTB), the method comprising:
    transmitting a first message to a first queue, wherein the first message comprises a request to read data and wherein the first queue is associated with the remote processor; and
    receiving the data requested by the first message,
    wherein the local processor and remote processor are coupled via the PCIe NTB, and
    wherein the transmitting and receiving steps are performed using posted memory write transaction sent through the PCIe NTB.

7. The method of claim 6, wherein the first message comprises a destination address for receiving the requested data.

8. The method of claim 7, further comprising receiving a second message at a second queue, wherein the second message indicates completion of a data transfer associated with the read request of the first message, wherein the second queue is associated with the local processor, and wherein receiving the second message is performed using a posted memory write transaction sent through the PCIe NTB.

9. The method of claim 8, further comprising transmitting a third message to a third queue, wherein the third message indicates full reception of data associated with the read request of the first message, wherein the third queue is associated with the remote processor, and wherein transmitting the third message is performed using a posted memory write transaction sent through the PCIe NTB.

10. The method of claim 6, wherein the first message further comprises an indication that a size of the requested data is unknown.

11. The method of claim 6, further comprising:
    receiving a second message at a second queue, wherein the second message comprises an indication of a size of the requested data, wherein the second queue is associated with the local processor, and wherein receiving the second message is performed using a posted memory write transaction sent through the PCIe NTB; and
    prior to receiving the requested data, allocating memory to receive the data based on the indication of the size of the data.

12. An apparatus comprising:
    an interface to a Peripheral Component Interconnect Express (PCIe) Non-Transparent Bridge (NTB);
    a local memory; and
    a local processor, comprising:

a receive queue;
a transmit queue; and
a completion queue,
wherein the local processor is coupled to the local memory and the PCIe NTB, and
wherein the local processor is configured to receive messages sent to the receive queue, the transmit queue, and the completion queue by a plurality of remote processors via the PCIe NTB using posted memory write transactions.

13. The apparatus of claim 12, wherein the local processor is further configured to interpret a message sent to the transmit queue by one of the plurality of remote processors as a request to transfer data from a memory location in the local memory to a memory location associated with the remote processor.

14. The apparatus of claim 12, wherein the local processor is further configured to interpret a message sent to the receive queue by one of the plurality of remote processors as a request to allocate one or more memory locations in the local memory for data to be transferred from a memory location associated with the remote processor.

15. The apparatus of claim 12, wherein the local processor is further configured to interpret a message sent to the completion queue by one of the plurality of remote processors as an indicator that the remote processor has received data sent by the local processor.

16. The apparatus of claim 12, wherein the local processor is further configured to interpret a message sent to the completion queue by one of the plurality of remote processors as an indicator that the remote processor has finished sending data to the local processor.

17. The apparatus of claim 14, wherein the request to transfer data comprises an indicator of the size of the data to be transferred, and wherein the local processor is further configured to: allocate one or more memory locations in the local memory to receive the data to be transferred, create a destination address list comprising addresses of the memory locations allocated to receive the transmitted data, and write a message comprising the destination address list into a transmit queue associated with the remote processor using a posted memory write transaction.

* * * * *